United States Patent
Huh

(10) Patent No.: US 11,333,065 B2
(45) Date of Patent: May 17, 2022

(54) VARIABLE FLOW RATE VALVE MECHANISM AND TURBOCHARGER

(71) Applicant: IHI Corporation, Tokyo (JP)

(72) Inventor: Jaemin Huh, Tokyo (JP)

(*) Notice: Subject to any disclaimer, the term of this patent is extended or adjusted under 35 U.S.C. 154(b) by 0 days.

(21) Appl. No.: 17/131,744

(22) Filed: Dec. 23, 2020

(65) Prior Publication Data
US 2021/0108558 A1 Apr. 15, 2021

Related U.S. Application Data

(63) Continuation of application No. PCT/JP2019/016193, filed on Apr. 15, 2019.

(30) Foreign Application Priority Data

Jul. 5, 2018 (JP) .............................. JP2018-128330

(51) Int. Cl.
 *F02B 37/18* (2006.01)
(52) U.S. Cl.
 CPC ........ *F02B 37/183* (2013.01); *F05D 2220/40* (2013.01); *F05D 2240/70* (2013.01); *F05D 2260/606* (2013.01)
(58) Field of Classification Search
 CPC .. F02B 37/183; F02B 37/186; F05D 2220/40; F05D 2240/70; F05D 2260/606; Y02T 10/12
 See application file for complete search history.

(56) References Cited

U.S. PATENT DOCUMENTS

| | | | |
|---|---|---|---|
| 9,127,590 B2 | 9/2015 | Schoenherr et al. | |
| 9,297,297 B2 | 3/2016 | Chu | |
| 9,464,565 B2 | 10/2016 | Yamaguchi et al. | |
| 11,203,970 B2 * | 12/2021 | DePaoli | F01D 17/105 |
| 2012/0055154 A1 | 3/2012 | Ebert | |
| 2014/0169946 A1 | 6/2014 | Stilgenbauer et al. | |

(Continued)

FOREIGN PATENT DOCUMENTS

| | | |
|---|---|---|
| CN | 108027074 | 5/2018 |
| JP | S63-009426 | 1/1988 |

(Continued)

OTHER PUBLICATIONS

International Search Report dated May 28, 2019 for PCT/JP2019/016193.

(Continued)

*Primary Examiner* — Jesse S Bogue
(74) *Attorney, Agent, or Firm* — Soei Patent & Law Firm

(57) ABSTRACT

A variable flow rate valve mechanism includes a valve including a valve body and a valve shaft projecting from the valve body, a lock member fixed to the valve shaft at a position axially spaced from the valve body, an attachment member disposed between the valve body and the lock member and holding the valve together with the lock member, and a spring washer disposed between the lock member and the attachment member or between the attachment member and the valve body, and contacting the lock member or the valve body and the attachment member to impart an elastic force to the attachment member. A first member or a second member has an inner face, the inner face facing radially inward and facing an outer peripheral portion of the spring washer.

20 Claims, 11 Drawing Sheets

(56) References Cited

U.S. PATENT DOCUMENTS

| | | |
|---|---|---|
| 2014/0366530 A1 | 12/2014 | Murayama et al. |
| 2014/0366531 A1 | 12/2014 | Segawa |
| 2016/0341112 A1 | 11/2016 | Goeckelmann et al. |
| 2016/0348574 A1 | 12/2016 | Goeckelmann et al. |
| 2017/0248071 A1* | 8/2017 | Diemer ............... F02B 37/186 |
| 2018/0073425 A1* | 3/2018 | Stilgenbauer ......... F02B 37/186 |
| 2018/0094573 A1* | 4/2018 | Schoenherr ........... F02B 37/186 |
| 2018/0156105 A1 | 6/2018 | Igarashi |
| 2018/0298811 A1 | 10/2018 | Tanigaki |
| 2019/0003376 A1* | 1/2019 | Schawer ............... F02B 37/186 |
| 2019/0003377 A1 | 1/2019 | Jaenike et al. |
| 2019/0010864 A1 | 1/2019 | Hoffmann |
| 2019/0195270 A1* | 6/2019 | Lee ........................ F16B 39/26 |
| 2020/0355113 A1 | 11/2020 | Jaenike et al. |

FOREIGN PATENT DOCUMENTS

| | | |
|---|---|---|
| JP | 2012-527575 | 11/2012 |
| JP | 2013-185552 | 9/2013 |
| JP | 2014-105843 | 6/2014 |
| JP | 2016-205252 | 12/2016 |
| JP | 2018-091275 | 6/2018 |
| WO | 2013/133376 | 9/2013 |
| WO | 2017/125240 | 7/2017 |
| WO | 2017/125241 | 7/2017 |
| WO | 2017/157769 | 9/2017 |

OTHER PUBLICATIONS

International Preliminary Report on Patentability with Written Opinion dated Jan. 14, 2021 for PCT/JP2019/016193.

* cited by examiner

VARIABLE FLOW RATE VALVE MECHANISM AND TURBOCHARGER

CROSS-REFERENCE TO RELATED APPLICATIONS

This application is a continuation application of PCT Application No. PCT/JP2019/016193, filed on Apr. 15, 2019, which claims the benefit of priority from Japanese Patent Application No. 2018-128330, filed on Jul. 5, 2018, the entire contents of which are incorporated herein by reference.

BACKGROUND

In regard to turbocharger turbines, a valve structure for opening and closing an opening of an exhaust gas bypass formed in a turbine housing is conventionally known. U.S. Pat. No. 9,127,590 describes an annular spring member disposed between a valve support member and a washer through which the shaft of a valve body passes. Japanese Unexamined Patent Publication No. 2012-527575 describes a spring element (spring member) disposed between a flap plate and a lever, or between a lever and a disk. The spring element reduces or prevents wear that may occur at the contact point between the two members.

SUMMARY

A variable flow rate valve mechanism according to one aspect of the present disclosure includes a valve, a lock member, an attachment member, and a spring washer. The valve includes a valve body and a valve shaft projecting from the valve body and having an axis, and the lock member is fixed to the valve shaft at a position axially spaced from the valve body. The attachment member is disposed between the valve body and the lock member, and holds the valve together with the lock member. Additionally, the spring washer may be disposed between the lock member and the attachment member. In some examples, the spring washer may be disposed between the attachment member and the valve body. The spring washer contacts a first member and a second member. In some examples, the first member may be the lock member or the valve body, and the second member may be the attachment member. The spring washer is configured to impart an elastic force to the attachment member. Additionally, the spring washer includes an outer peripheral portion contacting one of the first member and the second member. In some examples, one of the first member and the second member has an inner face, the inner face facing radially inward and facing the outer peripheral portion of the spring washer.

DETAILED DESCRIPTION

Figure 1:
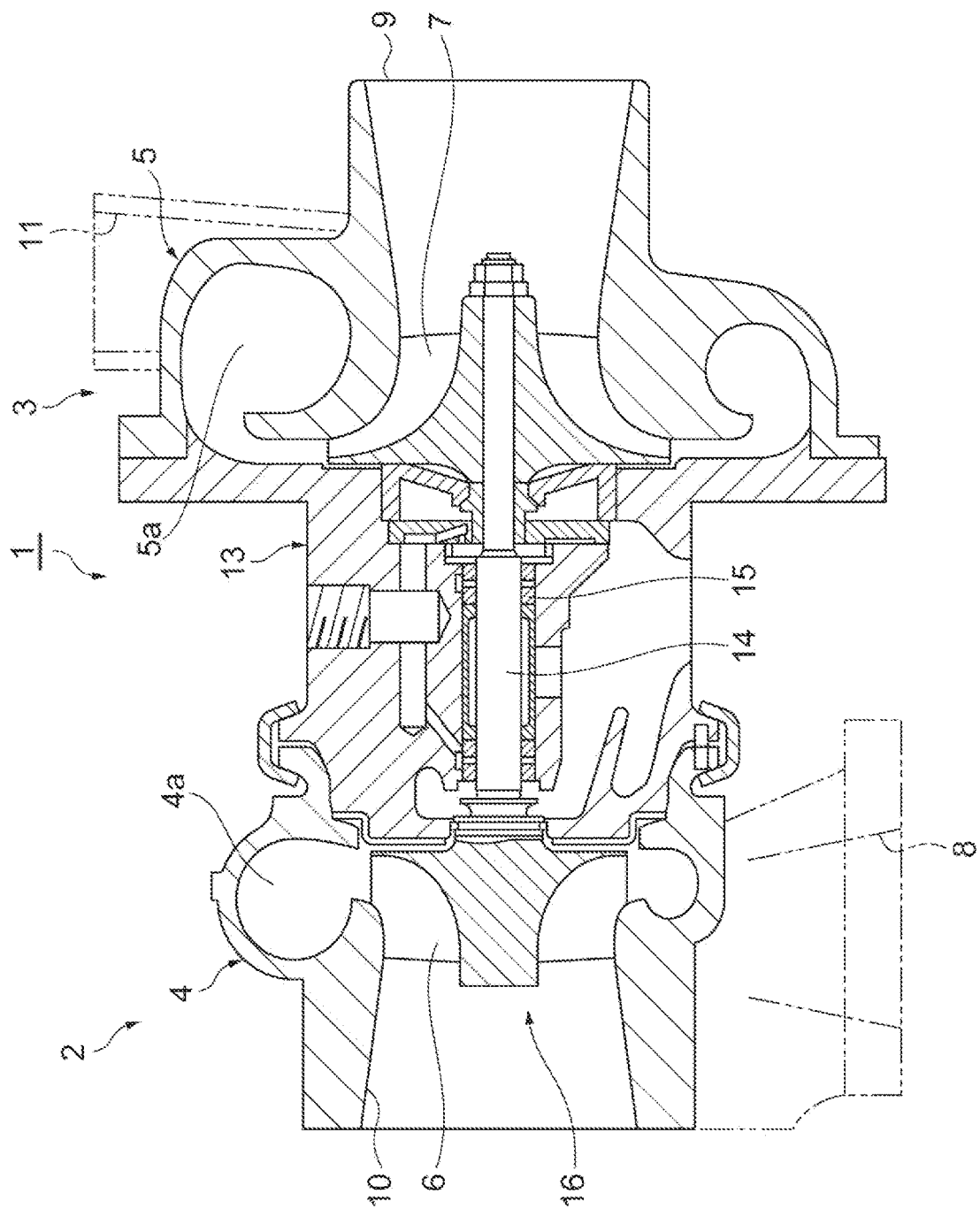
FIG. 1 is a cross-sectional view of an example turbocharger to which an example variable flow rate valve mechanism is applied.

An example variable flow rate valve mechanism includes a valve, a lock member, an attachment member, and a spring washer. The valve includes a valve body and a valve shaft projecting from the valve body and having an axis, and the lock member is fixed to the valve shaft at a position axially spaced from the valve body. The attachment member is disposed between the valve body and the lock member and holds the valve together with the lock member. Additionally, the spring washer may be disposed between the lock member and the attachment member. In some examples, the spring washer may be disposed between the attachment member and the valve body. The spring washer contacts a first member and a second member. In some examples, the first member may be the lock member or the valve body, and the second member may be the attachment member. The spring washer is configured to impart an elastic force to the attachment member. Additionally, the spring washer includes an outer peripheral portion contacting one of the first member and the second member. In some examples, one of the first member and the second member has an inner face, the inner face facing radially inward and facing the outer peripheral portion of the spring washer.

According to this example variable flow rate valve mechanism, the spring washer contacts the first member which is the lock member or the valve body and the second member which is the attachment member to impart an elastic force to the attachment member. The spring washer is capable of reducing wear of contact portions between the lock member, the valve attachment member, and the valve body, or vibrations of the valve and the like. When the space between the first member and the second member is reduced, the spring washer may deform under an axial force. When the spring washer tries to extend radially, the inner face formed on the one of the first member and the second member contacts the outer peripheral portion of the spring washer. Radially outward deformation of the spring washer is thus suppressed. As a result, the degradation of elasticity of the spring washer is suppressed.

In some examples, the one of the first member and the second member includes a projecting portion projecting toward a gap formed between the first member and the second member, and the projecting portion has the inner face facing the outer peripheral portion of the spring washer formed thereon. The projecting portion that includes the inner face that faces (or contacts) the outer peripheral portion of the spring washer is capable of reliably suppressing radially outward deformation of the spring washer.

In some examples, either of the first member and the second member which does not have the inner face includes a seating face in constant contact with the spring washer, and a recessed portion recessed from the seating face, formed in a position axially facing the projecting portion, the recessed portion configured to receive the projecting portion. In this case, when the space between the first member and the second member is reduced and the spring washer deforms, the projecting portion is received by the recessed portion. The axial relative movement distance of the first member and the second member is thus secured. The elastic force of the spring washer can be sufficiently exerted by ensuring an axial stroke while deformation of the spring washer is suppressed by the projecting portion including the inner face.

In some examples, either of the first member and the second member which does not have the inner face includes a seating face in constant contact with the spring washer, and a flat portion flush with the seating face and formed in a position axially facing the projecting portion. In this case, when the space between the first member and the second member is reduced and the spring washer deforms, the projecting portion contacts the flat portion. Since the flat portion is flush with the seating face, the axial relative movement distance of the first member and the second member is reduced. This can prevent the spring washer from deforming to the degree that plastic deformation occurs.

In some examples, the one of the first member and the second member includes a groove portion receiving the outer peripheral portion of the spring washer, the groove portion having the inner face facing the outer peripheral portion of the spring washer. Since the outer peripheral portion of the spring washer is received in the groove portion, and the inner face which faces (or contacts) the outer peripheral portion of the spring washer is formed inside the groove portion, the radially outward deformation of the spring washer can be reliably suppressed.

In some examples, the spring washer includes the outer peripheral portion in constant contact with the one of the first member and the second member, an inner peripheral portion positioned closer to the valve shaft than the outer peripheral portion and in constant contact with the one of the first member and the second member, and an intermediate portion formed between the outer peripheral portion and the inner peripheral portion and in constant contact with the other of the first member and the second member. In this case, the outer peripheral portion and the inner peripheral portion (two radial parts) of the spring washer contact one of the members, and the intermediate portion between the outer peripheral portion and the inner peripheral portion thereof contacts the other of the members. Such an arch-shaped contact structure works favorably to reduce wear or vibrations. Moreover, the spring washer design facilitates the manufacturing process.

Another example variable flow rate valve mechanism includes a valve, a lock member, an attachment member, and a spring washer. The valve includes a valve body and a valve shaft projecting from the valve body and having an axis, and the lock member is fixed to the valve shaft at a position axially spaced from the valve body. The attachment member is disposed between the valve body and the lock member and holds the valve together with the lock member. Additionally, the spring washer may be disposed between the lock member and the attachment member. In some examples, the spring washer is disposed between the attachment member and the valve body. The spring washer contacts a first member and a second member. In some examples, the first member may be the lock member or the valve body, and the second member may be the attachment member. The spring washer is configured to impart an elastic force to the attachment member. Additionally, the spring washer includes an outer peripheral portion contacting one of the first member and the second member. In some examples, one of the first member and the second member includes a regulating means configured to regulate radially outward movement of the outer peripheral portion of the spring washer by contacting the outer peripheral portion.

This variable flow rate valve mechanism also produces the same operation and effects as those described above. That is, the regulating means regulates the radially outward movement of the outer peripheral portion of the spring washer by contacting the outer peripheral portion, to thereby suppress the radially outward deformation of the spring washer. As a result, the degradation of elasticity of the spring washer is suppressed.

Another example variable flow rate valve mechanism includes a valve assembly, a cavity and a spring washer. The valve assembly includes a valve, a lock member and an attachment member. The valve includes a valve body and a valve shaft projecting from the valve body in an axial direction. The lock member is fixed to the valve shaft. The attachment member is located between the valve body and the lock member and holds the valve together with the lock member. The cavity is formed by the lock member, the valve body and the valve shaft. The cavity accommodates the attachment member. The spring washer is accommodated in the cavity. The spring washer is located between the attachment member and a cavity wall of the cavity in the axial direction, and located between the valve shaft and a retention surface of the valve assembly in a radial direction of the valve shaft. The retention surface faces toward the valve shaft in the radial direction.

An example turbocharger includes any one of the variable flow rate valve mechanisms described herein. The turbocharger includes a turbine and a compressor driven by a rotational drive force by the turbine, wherein the valve body of the variable flow rate valve mechanism is configured to open and close an opening portion of a bypass passage formed in the turbine. In this case, reliability of the turbine is improved, since the degradation of elasticity of the spring washer is suppressed in the variable flow rate valve mechanism.

Hereinafter, with reference to the drawings, the same elements or similar elements having the same function are denoted by the same reference numerals, and redundant description will be omitted. Herein, "circumferentially" and "radially" mean directions relative to an axis X. For example, a radial direction may be understood to be orthogonal to the axis X (see FIG. 5).

Figure 2:
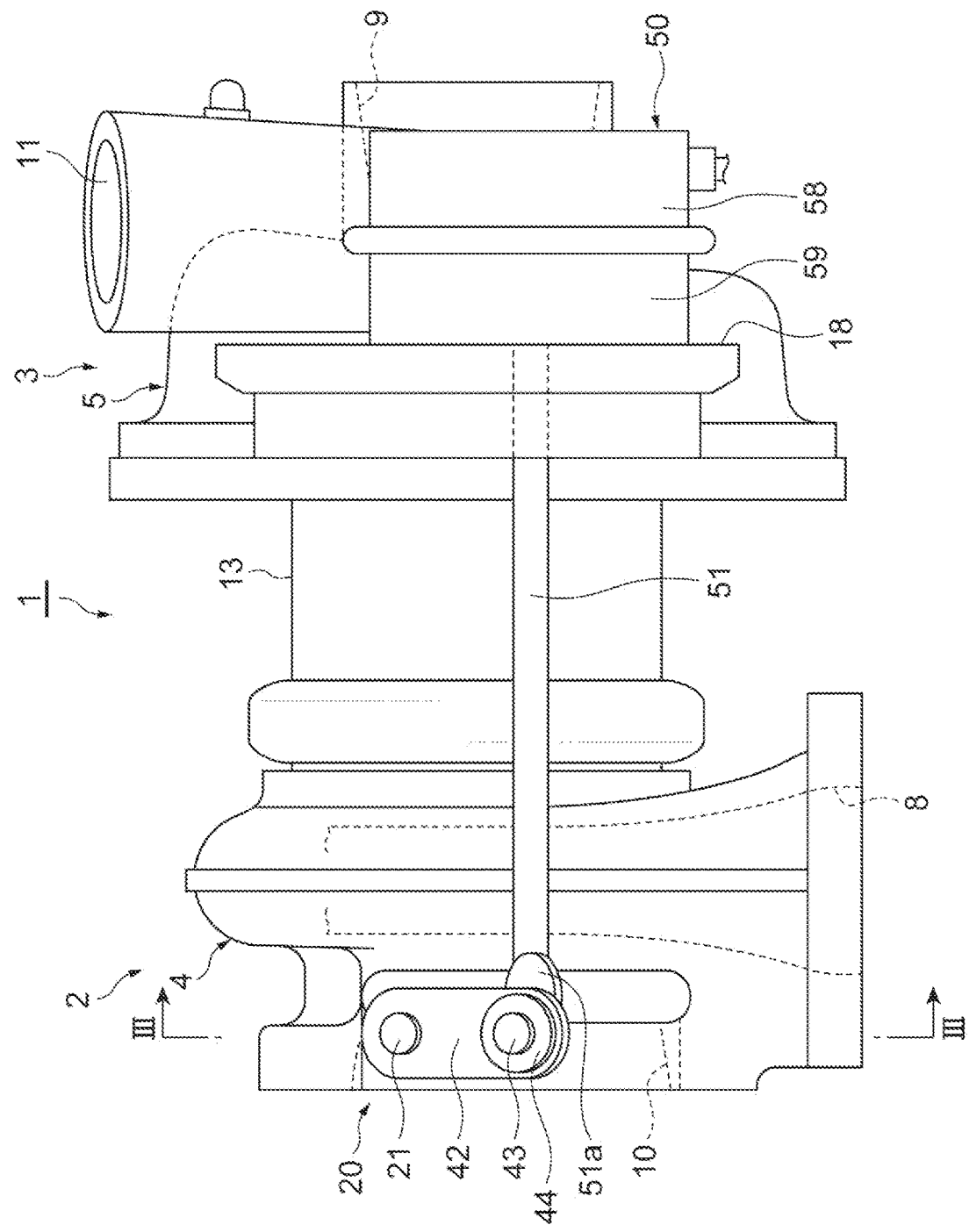
FIG. 2 is a side view of the example turbocharger of FIG. 1.
Figure 3:
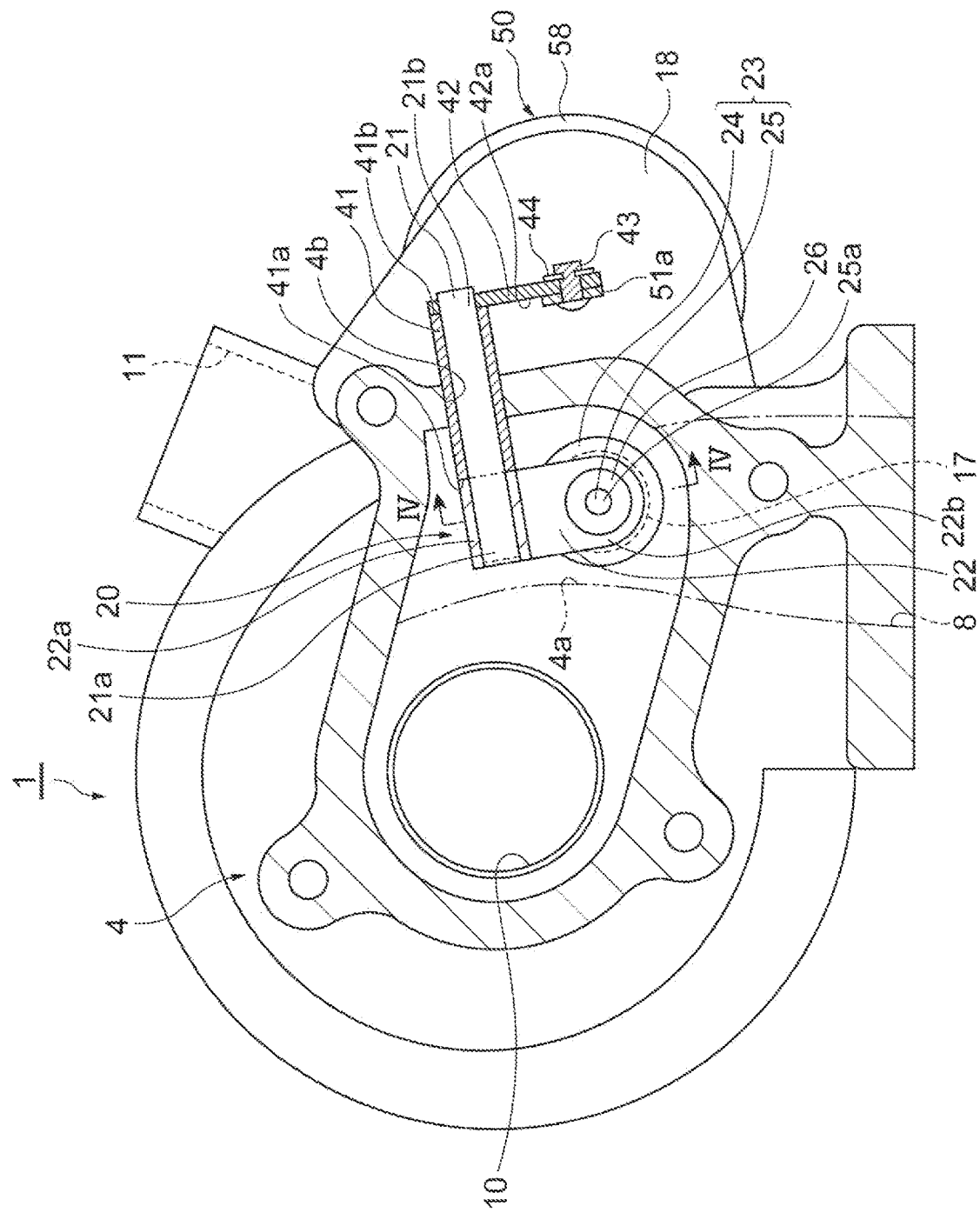
FIG. 3 is a cross-sectional view taken along line III-III through the example turbocharger of FIG. 2.

An example turbocharger 1 shown in FIGS. 1 to 3 is, for example, a turbocharger for a vehicle, and compresses air supplied to an engine not shown by using exhaust gas discharged from the engine. As shown in FIG. 1, the turbocharger 1 includes a turbine 2 and a compressor 3. The turbine 2 includes a turbine housing 4 and a turbine wheel 6 contained in the turbine housing 4. The compressor 3 includes a compressor housing 5, and a compressor wheel 7 contained in the compressor housing 5.

The turbine wheel 6 is formed on a first end of a rotating shaft 14 and the compressor wheel 7 is formed on a second end of the rotating shaft 14. A bearing housing 13 is formed between the turbine housing 4 and the compressor housing 5. The rotating shaft 14 is rotatably supported by the bearing housing 13 via a bearing 15. The turbocharger 1 includes a turbine rotor shaft 16. The turbine rotor shaft 16 includes the rotating shaft 14 and the turbine wheel 6. The turbine rotor shaft 16 and the compressor wheel 7 rotate as an integrated rotating body.

The turbine housing 4 has an exhaust gas inlet 8 and an exhaust gas outlet 10. The exhaust gas discharged from the engine flows into a turbine scroll channel 4a via the exhaust gas inlet 8, causes the turbine wheel 6 to rotate, and then flows out of the turbine housing 4 via the exhaust gas outlet 10.

The compressor housing 5 has an inlet port 9 and a discharge port 11. When the turbine wheel 6 rotates as described above, the turbine rotor shaft 16 and the compressor wheel 7 rotate. The rotating compressor wheel 7 compresses the air drawn in from the inlet port 9. The compressed air passes through a compressor scroll channel 5a and is discharged from the discharge port 11. The compressed air discharged from the discharge port 11 is supplied to the engine. The compressor 3 is thus driven by a rotational drive force by the turbine 2.

The turbine housing 4 has therein a bypass passage (see FIG. 3) 17 for directing a portion of the exhaust gas introduced from the exhaust gas inlet 8 toward the exhaust gas outlet 10, bypassing the turbine wheel 6. The bypass passage 17 is a variable gas flow rate passage to enable the flow rate of the exhaust gas supplied toward the turbine wheel 6 to be variable.

As shown in FIGS. 2 and 3, the turbocharger 1 includes a wastegate valve 20 (an example of a variable flow rate valve mechanism) formed inside the turbine housing 4. The wastegate valve 20 is configured so as to open and close an opening portion of the bypass passage 17. The wastegate valve 20 includes a stem 21 that is rotatably supported with respect to an outer wall of the turbine housing 4, a valve attachment member (attachment member) 22 that protrudes from a first end 21a of the stem 21 in a radial direction of the stem 21, a valve 23 that is held by a distal end portion 22b of the valve attachment member 22, a lock plate (lock member) 26 that is fixed to one end of the valve 23 and holds the valve 23 together with the valve attachment member 22, and a spring washer 30 (see FIG. 4) that is disposed between the valve attachment member 22 and the lock plate 26. In some examples, the valve 23, the lock member 26, and the valve attachment member 22 may form a valve assembly V (see FIG. 5).

The turbine housing 4 has, on the outer wall, a support hole (through hole) 4b that passes through the outer wall in a thickness direction. A cylindrical bearing 41 is inserted into the support hole 4b. The bearing 41 is fixed to the outer wall of the turbine housing 4. The bearing 41 may have a constant diameter from a first end to a second end in an axial direction. In some examples, a first end face 41a of the bearing 41 positioned inside the turbine housing 4 is flat and a second end face 41b of the bearing 41 positioned outside the turbine housing 4 is also flat. The bearing 41 may have a small diameter portion that is formed on the first end side inside the turbine housing 4 and a large diameter portion that is formed on the second end side outside the turbine housing 4. The bearing 41 may include an inclined portion having a diameter that increases from the first end toward the second end.

The stem 21 is inserted into the bearing 41 and is rotatably supported with respect to the outer wall of the turbine housing 4. The first end 21a of the stem 21 disposed inside the turbine housing 4 is inserted into a tubular portion formed in a base end portion 22a of the valve attachment member 22. The base end portion 22a of the valve attachment member 22 is joined to the first end 21a of the stem 21 by welding or the like. An end face of the tubular portion, on the bearing 41 side, formed in the base end portion 22a of the valve attachment member 22 is parallel to the first end face 41a of the bearing 41 and faces the first end face 41a. The stem 21 rotates about the axis of the stem 21 to cause the valve attachment member 22 to swing. The valve attachment member 22 has, on the plate-like distal end portion 22b, a through hole 22c (see FIG. 4) for fitting the valve 23 therein.

The link member 42, which has a plate shape and protrudes in the radial direction of the stem 21, is fixed to a second end 21b of the stem 21, which is disposed outside the turbine housing 4. The second end 21b of the stem 21 is passed through a through hole formed in the link member 42. A rear face 42a of the link member 42 is parallel to the second end face 41b of the bearing 41 and faces the second end face 41b.

The link member 42 has, on a distal end portion, a through hole into which a connection pin 43 is inserted. The connection pin 43 is also inserted into a through hole formed in a distal end portion 51a of an operating rod 51 of an actuator 50. A first end portion of the connection pin 43 is fixed to the operating rod 51 by riveting. A second end portion of the connection pin 43 has a clip 44 mounted thereto to prevent the connection pin 43 from falling out of the through hole. The distal end portion 51a of the operating rod 51 and the connection pin 43 are rotatable with respect to the link member 42. The distal end portion of the link member 42 swings about the axis of the stem 21 with the movement of the operating rod 51. In some examples, the stem 21 is connected to the operating rod 51 of the actuator 50 via the link member 42 and the connection pin 43.

The actuator 50 is fixed to a bracket 18 that projects laterally from the compressor housing 5. The actuator 50 includes, for example, the operating rod 51, a diaphragm that drives the operating rod 51, adjacent low pressure chamber 59 and high pressure chamber 58 with the diaphragm interposed therebetween in an axial direction of the operating rod 51, and a restoring spring that is disposed inside the low pressure chamber 59 and biases the diaphragm. The actuator 50 moves the operating rod 51 toward a distal end when the pressure at an exit side of the compressor 3 reaches a set pressure, and moves the operating rod 51 toward a base end when the pressure at the exit side of the compressor 3 drops below the set pressure.

Figure 4:
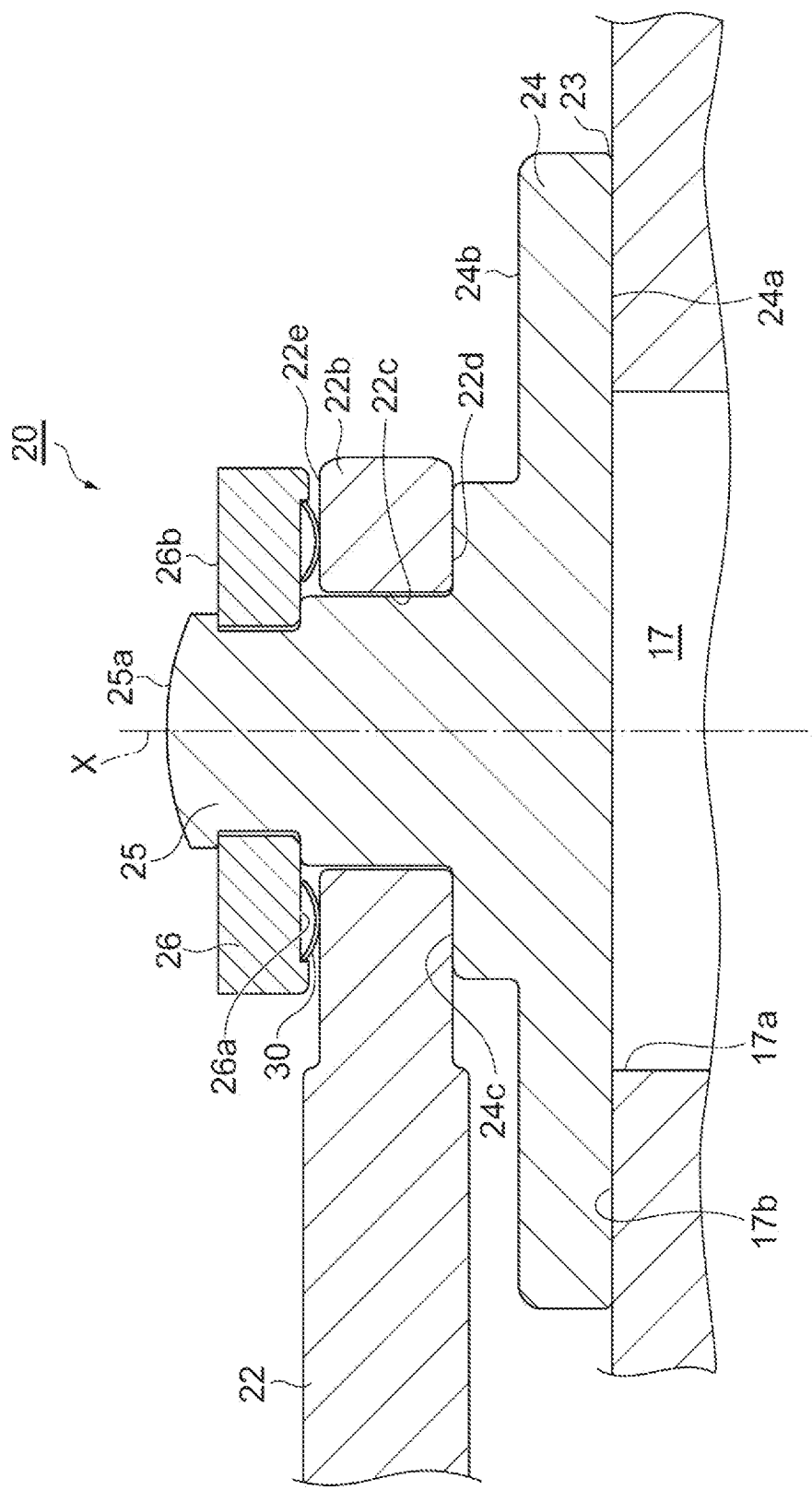
FIG. 4 is a cross-sectional view of an example variable flow rate valve mechanism taken along line IV-IV through the example turbocharger of FIG. 3.

The wastegate valve 20 will next be described in detail. As shown in FIGS. 3 and 4, the valve 23 is capable of abutting against and separating from a peripheral edge portion 17b of an opening portion 17a of the bypass passage 17. The valve 23 has a valve body 24 and a valve shaft 25 that projects from the valve body 24. The valve body 24 is, for example, disk-shaped. The valve body 24 includes a sealing face 24a that faces the peripheral edge portion 17b, a rear face 24b opposite the sealing face 24a, and a support face 24c that projects from the rear face 24b. The valve body 24 is configured to open and close the opening portion 17a of the bypass passage 17 formed in the turbine 2. The valve shaft 25 projects toward an opposite side of the valve body 24 from the bypass passage 17. The valve shaft 25 projects from the support face 24c of the valve body 24. The valve shaft 25 has the axis X and is, for example, cylindrically shaped. The valve shaft 25 is, for example, integrally formed with the valve body 24.

The valve shaft 25 is inserted into the through hole 22c in the distal end portion 22b of the valve attachment member 22. The distal end portion 22b of the valve attachment member 22 is disposed between the valve body 24 and the lock plate 26. The distal end portion 22b of the valve attachment member 22 has a first front face 22d that faces the valve body 24 and a second front face 22e opposite the first front face 22d. The first front face 22d and the second front face 22e are, for example, parallel to each other. That is, the distal end portion 22b of the valve attachment member 22 has a constant thickness. The first front face 22d of the valve attachment member 22 abuts the support face 24c of the valve body 24.

The lock plate 26 is fixed to an end portion 25a of the valve shaft 25 opposite the valve body 24 side. The lock plate 26 is fixed to the valve shaft 25, for example, by riveting, at a position spaced from the valve body 24 in a direction of the axis X (e.g., in the axial direction). The lock plate 26 is fixed to the valve shaft 25 such that the valve attachment member 22 is disposed between the valve body 24 and the lock plate 26. The attachment member 22 may therefore be accommodated in a cavity C formed by the valve body 24, the lock plate 26, and the valve shaft 25 (see FIG. 5). The lock plate 26 has a first lock face 26a that faces the valve attachment member 22 and a second lock face 26b opposite the first lock face 26a. The first lock face 26a and the second lock face 26b are, for example, parallel to each other.

The valve shaft 25 has an outer diameter that is smaller than an inner diameter of the through hole 22c. The distance between the first lock face 26a of the lock plate 26 and the support face 24c of the valve body 24 is greater than the thickness of the valve attachment member 22. That is, a gap S is formed between the first lock face 26a of the lock plate 26 and the second front face 22e of the valve attachment member 22. The valve attachment member 22 is thus attached to the valve shaft 25 by being disposed between the valve body 24 and the lock plate 26, and holds the valve 23 together with the lock plate 26.

The spring washer 30 is disposed between the valve attachment member 22 and the lock plate 26, and imparts an elastic force to the valve attachment member 22 and the valve 23. The spring washer 30 is formed annularly about the axis X (see FIG. 4) of the valve shaft 25. In some examples, the spring washer 30 is disposed between a first member which is the lock plate 26 and a second member which is the valve attachment member 22. The spring washer 30 is in constant contact with the first lock face 26a of the lock plate 26 and in constant contact with the second front face 22e of the valve attachment member 22.

Figure 5:
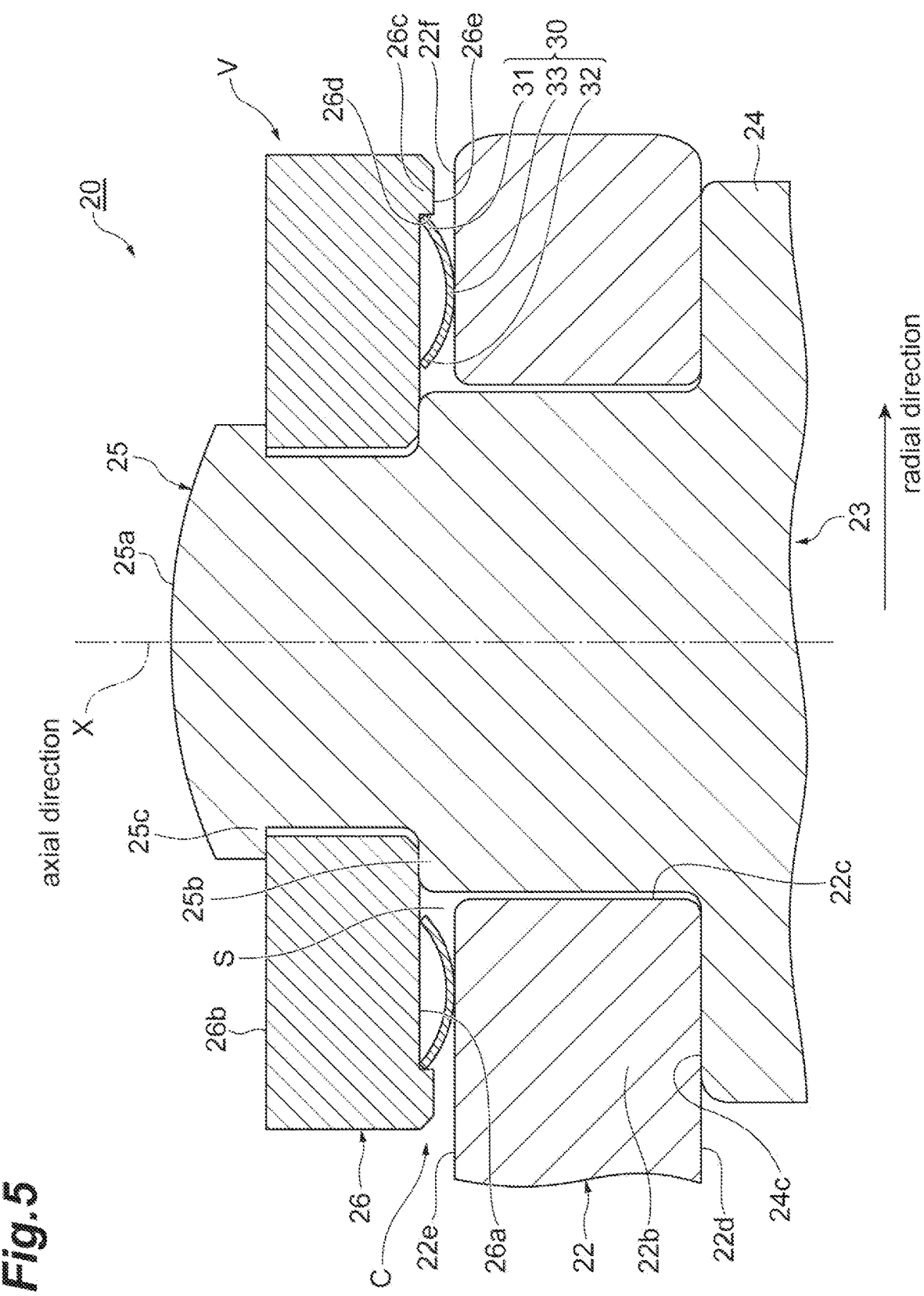
FIG. 5 is a partially enlarged view of FIG. 4, and is a cross-sectional view of the example variable flow rate valve mechanism in which a spring washer is disposed between a lock member and an attachment member.

As shown in FIG. 5, the spring washer 30 is formed of a material having elasticity and has an arch-shaped cross-section. The spring washer 30 includes an annular outer peripheral portion 31 that is in constant contact with the first lock face 26a of the lock plate 26, an annular inner peripheral portion 32 that is positioned closer to the valve shaft 25 than the outer peripheral portion 31 and is in constant contact with the first lock face 26a of the lock plate 26, and an intermediate portion 33 that is formed between the outer peripheral portion 31 and the inner peripheral portion 32 and is in constant contact with the second front face 22e of the valve attachment member 22. The outer peripheral portion 31 is positioned radially outward of the inner peripheral portion 32. In some examples, the outer peripheral portion 31 has a diameter that is larger than the diameter of the inner peripheral portion 32. The intermediate portion 33 is, for example, formed in a position substantially midway between the outer peripheral portion 31 and the inner peripheral portion 32. The intermediate portion 33 imparts spring properties to the spring washer 30. The spring washer 30 cut along a plane including the axis X has a cross-sectional shape in which, for example, an outer peripheral side and an inner peripheral side are symmetrical. A center line between the symmetrical outer peripheral side and inner peripheral side, for example, passes through the intermediate portion 33.

The lock plate 26 includes a projecting portion 26c that projects toward the gap S on an outer peripheral portion. The projecting portion 26c may be circumferentially continuous. One projecting portion 26c may be formed in an annular shape continuous along the entire circumference. Alternatively, a plurality of the projecting portions 26c may be formed circumferentially spaced apart from each other. That is, the projecting portion 26c may be formed in one portion or in a plurality of portions in a circumferential direction. An example in which one continuous annular projecting portion 26c is formed will be described. The lock plate 26 has an annular inner face (retention surface) 26d that faces radially inward and is formed on the projecting portion 26c. This inner face 26d is, for example, parallel to the axis X and is cylindrical in shape. The inner face 26d faces the outer peripheral portion 31 of the spring washer 30 and, for example, contacts the outer peripheral portion 31. The outer peripheral portion 31 is locked by the inner face 26d of the projecting portion 26c. In some examples, the outer peripheral portion 31 contacts the inner face 26d of the projecting portion 26c due to the elasticity of the spring washer 30, and is not bonded or fixed thereto. The outer peripheral portion 31 and the inner peripheral portion 32 of the spring washer 30 are both free ends. The inner peripheral portion 32 is spaced from the valve shaft 25 and does not contact the valve shaft 25. The outer peripheral portion 31 is a free end that is not fixed to the inner face 26d, but it can also be said that the outer peripheral portion 31 is an engaging end that is in constant contact with and engages with the inner face 26d.

The valve attachment member 22 includes, in the distal end portion 22b, a second front surface 22e that is a seating face with which the intermediate portion 33 of the spring washer 30 is in constant contact, and a flat face (flat portion) 22f that is flush with the second front surface 22e and is formed in a position facing the projecting portion 26c in the direction of the axis X. That is, the surface of the distal end portion 22b that faces the lock plate 26 does not have irregularities formed thereon. The flat face 22f faces an end face 26e of the projecting portion 26c. The flat face 22f is substantially parallel to the end face 26e and an annular gap that is smaller than the gap S is formed therebetween.

The inner face 26d formed on the lock plate 26 contacts the outer peripheral portion 31 of the spring washer 30 and regulates radially outward movement of the outer peripheral portion 31. In some examples, the projecting portion 26c including the inner face 26d is a regulating means that regulates radially outward movement of the outer peripheral portion 31 of the spring washer 30 by contacting the outer peripheral portion 31. This projecting portion 26c suppresses radially outward extension of the spring washer 30 and reduces the degradation of elasticity (so-called "permanent set in fatigue") of the spring washer 30. The regulating means includes both a structure that is in constant contact with the outer peripheral portion 31 of the spring washer 30, and a structure that is normally spaced from the outer peripheral portion 31 of the spring washer 30, but eventually contacts the outer peripheral portion 31 when the spring washer 30 deforms (that is, temporarily contacts the outer peripheral portion 31 only when the spring washer 30 deforms).

The gap between the flat face 22f and the end face 26e is set to a size such that the spring washer 30 does not plastically deform when the flat face 22f contacts the end face 26e. That is, a distance in which the lock plate 26 is movable in the direction of the axis X relative to the valve attachment member 22 is within a range of elastic deformation of the spring washer 30 (less than the elastic limit). A clearance between the projecting portion 26c and the valve attachment member 22 is set such that the spring washer 30 does not lose elasticity even when the spring washer 30 deforms and the projecting portion 26c contacts the second front face 22e.

According to an example wastegate valve 20, the spring washer 30 contacts the first member which is the lock plate 26 and the second member which is the valve attachment member 22, and imparts an elastic force to the valve attachment member 22. The spring washer 30 is capable of reducing wear of contact portions between the lock plate 26, the valve attachment member 22, and the valve body 24, or vibrations of the valve 23 and the like. When the space between the first member and the second member is reduced, the spring washer 30 may deform due to an axial force. When the spring washer 30 tries to extend radially, the inner face 26d formed on the projecting portion 26c of the lock plate 26 contacts the outer peripheral portion 31 of the spring washer 30. Radially outward deformation of the spring washer 30 is thus suppressed. As a result, the degradation of elasticity of the spring washer 30 is suppressed. When the spring washer 30 deforms, the inner peripheral portion 32 slides radially inward on the first lock face 26a and approaches the valve shaft 25. In some examples, when the spring washer 30 deforms, the inner peripheral portion 32 may contact the valve shaft 25.

The projecting portion 26c including the inner face 26d that faces (or contacts) the outer peripheral portion 31 of the spring washer 30 is capable of reliably suppressing radially outward deformation of the spring washer 30.

When the space between the first member and the second member is reduced and the spring washer 30 deforms, the projecting portion 26c contacts the flat face 22f. Since the flat face 22f is flush with the second front face 22e which is the seating face of the spring washer 30, the relative movement distance of the first member and the second member in the direction of the axis X is reduced. This can prevent the spring washer 30 from deforming to the degree that plastic deformation occurs, and thereby protect the spring washer 30.

The outer peripheral portion 31 and the inner peripheral portion 32 (two radial parts) of the spring washer 30 contact the lock plate 26, and the intermediate portion 33 thereof between the outer peripheral portion 31 and the inner peripheral portion 32 contacts the valve attachment member 22. Such an arch-shaped contact structure works favorably to reduce wear or vibrations. Moreover, the spring washer 30 design facilitates the manufacturing process.

The projecting portion 26c, as the regulating means, regulates the radially outward movement of the outer peripheral portion 31 of the spring washer 30 by contacting the outer peripheral portion 31, to thereby suppress the radially outward deformation of the spring washer 30. As a result, the degradation of elasticity of the spring washer 30 is suppressed.

In the turbocharger 1, since the degradation of elasticity of the spring washer 30 is suppressed in the wastegate valve 20, reliability of the turbine 2 is improved.

The wastegate valve of modified examples are described below. Details of features that are described in the examples above and apply also to the following examples are omitted in the description below.

Figure 6:
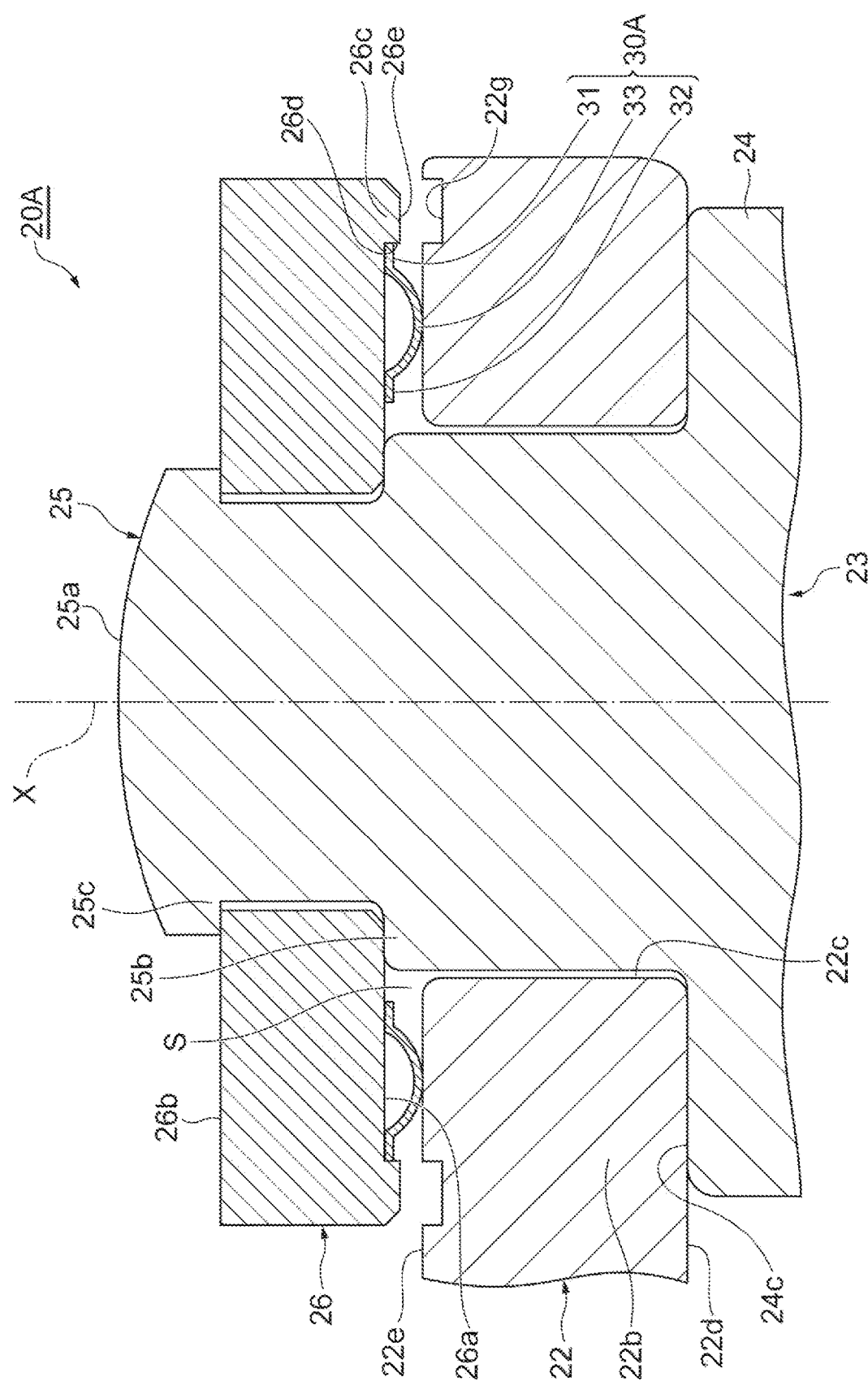
FIG. 6 is a cross-sectional view of another example variable flow rate valve mechanism.

As shown in FIG. 6, the distal end portion 22b of the valve attachment member 22 may include a recessed portion 22g that is recessed from the second front face 22e which is the seating face and formed in a position facing the projecting portion 26c in the direction of the axis X. The recessed portion 22g is shaped and sized so as to be capable of receiving the projecting portion 26c. That is, if the projecting portion 26c is annularly shaped, the recessed portion 22g is annularly shaped in the same size as the projecting portion 26c or larger than the projecting portion 26c. A plurality of the recessed portions 22g may be formed to correspond to a plurality of the projecting portions 26c.

The recessed portion 22g may have a depth (that is, a length from the second front face 22e to a bottom face of the recessed portion 22g) that is greater or less than a projecting length of the projecting portion 26c (that is, a length from the first lock face 26a to the end face 26e). The two may also be equal. Moreover, a spring washer 30A may be used in which the outer peripheral portion 31 and the inner peripheral portion 32 are annular and perpendicular to the axis X such that the outer peripheral portion 31 and the inner peripheral portion 32 contact the first lock face 26a as plane surfaces. The projecting portion 26c including the inner face (retention surface) 26d is a regulating means that regulates radially outward movement of the outer peripheral portion 31 of the spring washer 30A by contacting the outer peripheral portion 31. In some examples, the spring washer 30 that is the same as that of the wastegate valve 20 may also be used in a wastegate valve 20A.

Such wastegate valve 20A also produces the same operation and effects as those of the wastegate valve 20. However, in the wastegate valve 20A in which the recessed portion 22g is formed, when the space between the first member and the second member is reduced and the spring washer 30A deforms, the projecting portion 26c is received in the recessed portion 22g. The relative movement distance of the first member and the second member in the direction of the axis X is thus secured. The elastic force of the spring washer 30A can be sufficiently exerted by ensuring a stroke in the direction of the axis X while deformation of the spring washer 30A is suppressed by the projecting portion 26c including the inner face 26d.

Figure 7:
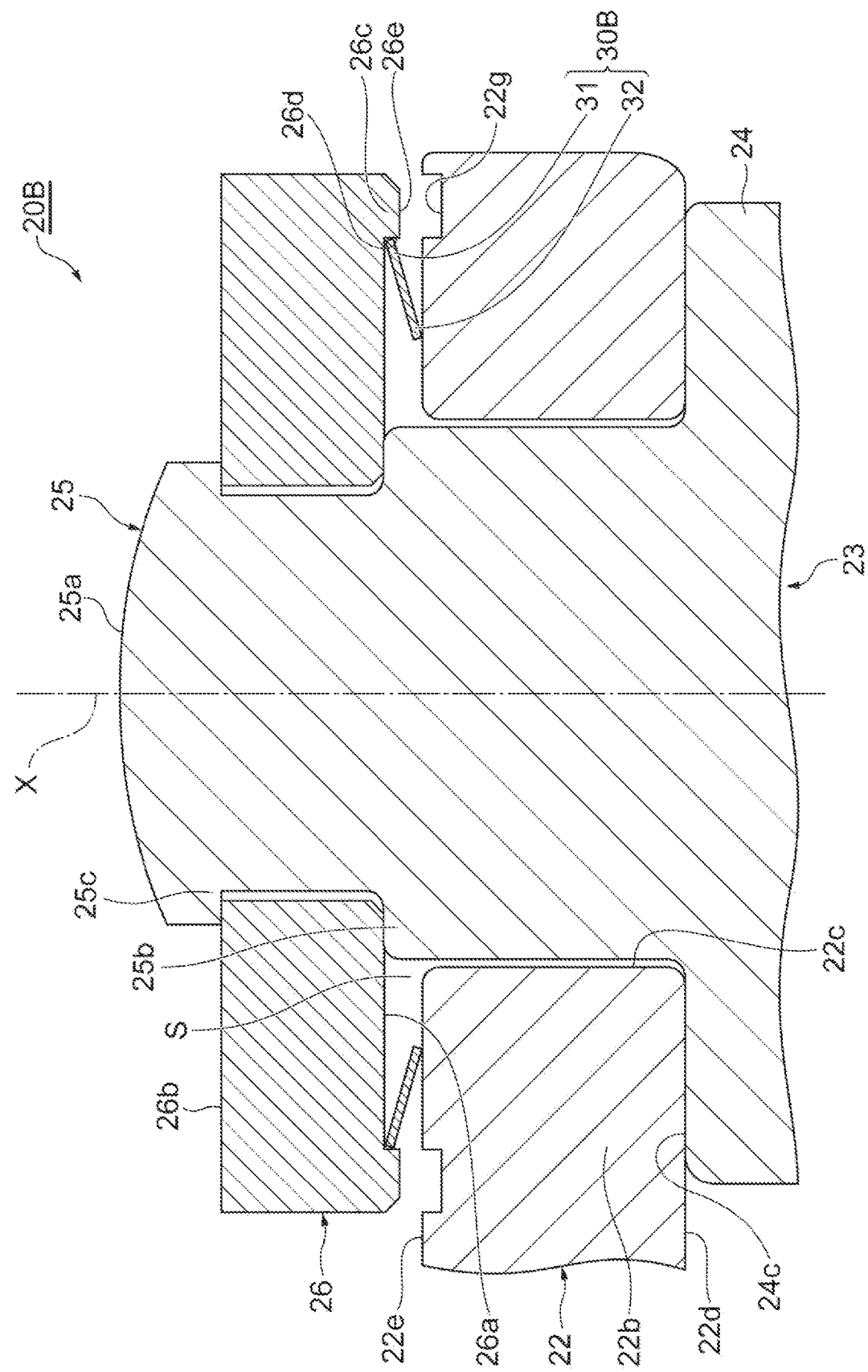
FIG. 7 is a cross-sectional view of another example variable flow rate valve mechanism.

As shown in FIG. 7, instead of the spring washer 30A of the wastegate valve 20A, a wastegate valve 20B may be employed that includes a spring washer 30B which is formed of an inclined surface having a constant slope from the outer peripheral portion 31 to the inner peripheral portion 32. Again, the projecting portion 26c including the inner face (retention surface) 26d is a regulating means that regulates radially outward movement of the outer peripheral portion 31 of the spring washer 30B by contacting the outer peripheral portion 31. Such wastegate valve 20B also produces the same operation and effects as those of the wastegate valve 20A.

Figure 8:
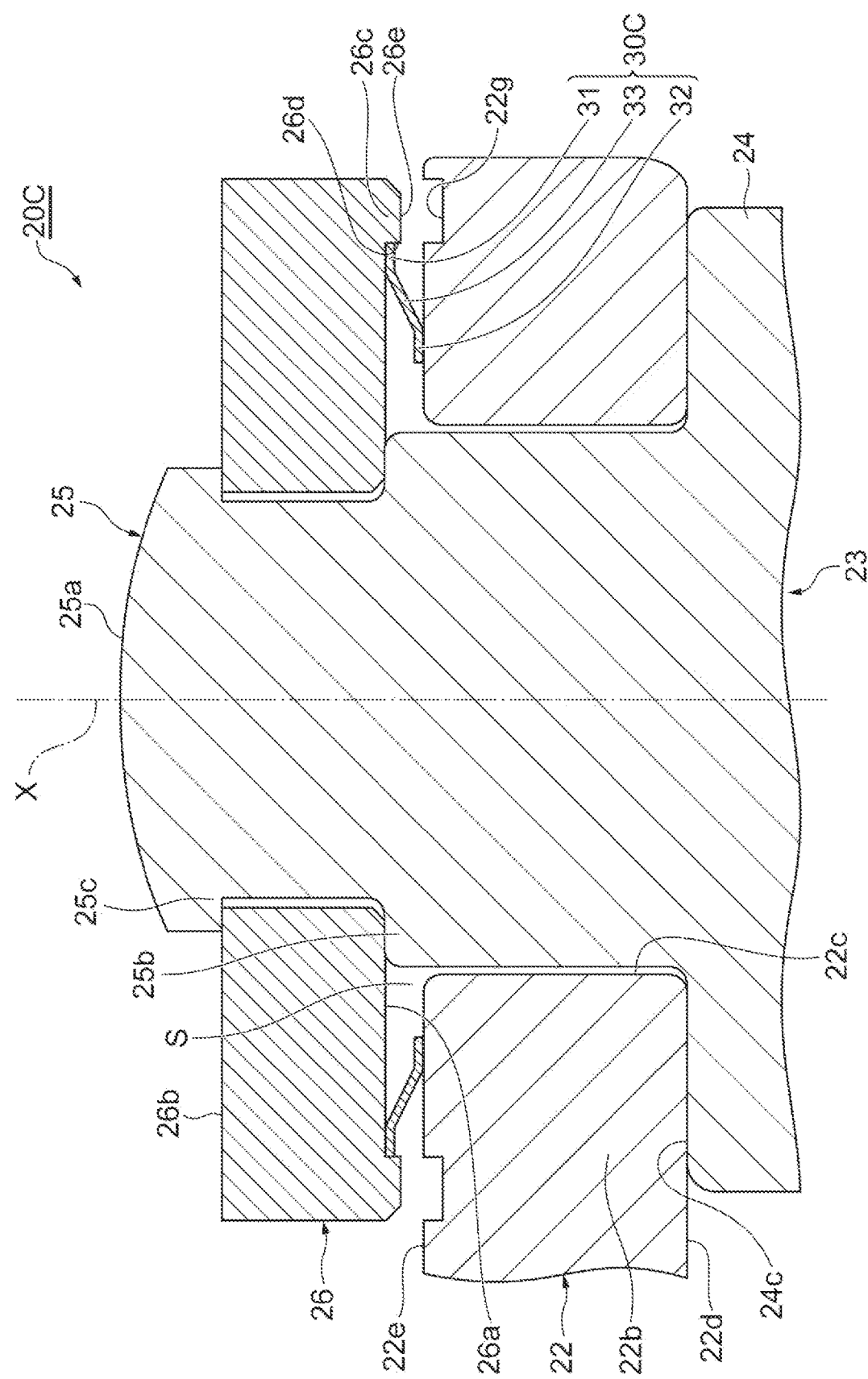
FIG. 8 is a cross-sectional view of another example variable flow rate valve mechanism.

As shown in FIG. 8, a spring washer 30C may be used in which the outer peripheral portion 31 and the inner peripheral portion 32 are annular and perpendicular to the axis X such that the outer peripheral portion 31 contacts the first lock face 26a as a plane surface and the inner peripheral portion 32 contacts the second front face 22e as a plane surface. In the spring washer 30C, the intermediate portion 33 is formed of an inclined surface having a constant slope. Again, the projecting portion 26c including the inner face (retention surface) 26*d* is a regulating means that regulates radially outward movement of the outer peripheral portion 31 of the spring washer 30C by contacting the outer peripheral portion 31. Such a wastegate valve 20C also produces the same operation and effects as those of the wastegate valve 20A.

Figure 9:
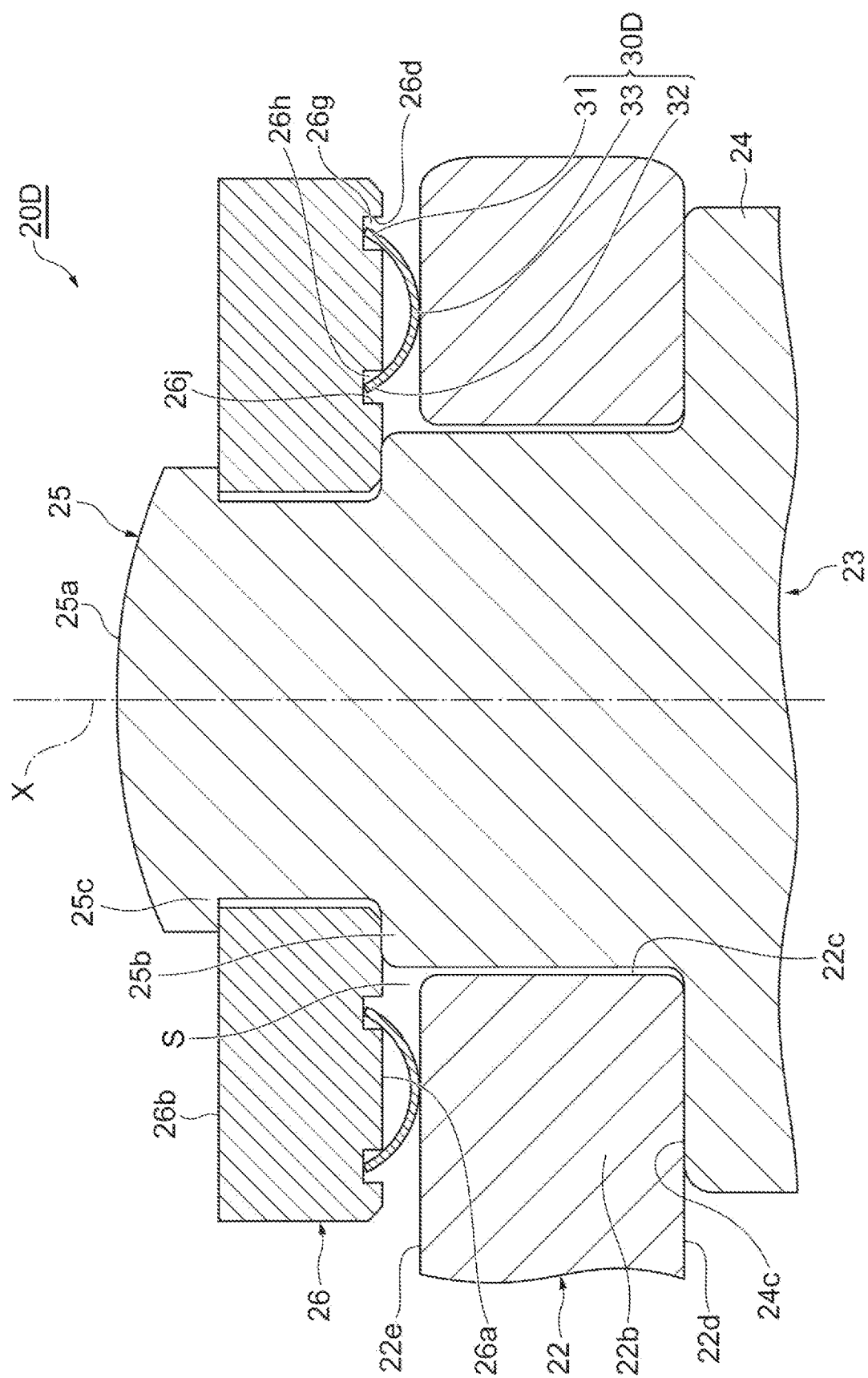
FIG. 9 is a cross-sectional view of another example variable flow rate valve mechanism.

As shown in FIG. 9, an arch-shaped spring washer 30D that has the same configuration as the spring washer 30 may be used, with the lock plate 26 having an annular groove portion 26*g* for receiving the outer peripheral portion 31 of the spring washer 30D and an annular groove portion 26*h* for receiving the inner peripheral portion 32 of the spring washer 30D. The outer peripheral portion 31 of the spring washer 30D is received in the groove portion 26*g* and faces the inner face (retention surface) 26*d* of the groove portion 26*g*. The inner peripheral portion 32 of the spring washer 30D is received in the groove portion 26*h* and faces an outer face 26*j* of the groove portion 26*h* that faces radially outward. The outer peripheral portion 31 and the inner peripheral portion 32 are respectively spaced from the inner face 26*d* and the outer face 26*j*. In some examples, at least one of the outer peripheral portion 31 and the inner peripheral portion 32 may contact at least one of the respective inner face 26*d* and the outer face 26*j*. Again, the groove portion 26*g* including the inner face 26*d* is a regulating means that regulates radially outward movement of the outer peripheral portion 31 of the spring washer 30D by contacting the outer peripheral portion 31. Such a wastegate valve 20D also produces the same operation and effects as those of the wastegate valve 20A. When the spring washer 30D deforms, the outer peripheral portion 31 moves radially outward inside the groove portion 26*g* to approach the inner face 26*d* (and contacts the inner face 26*d*) and/or the inner peripheral portion 32 moves radially inward inside the groove portion 26*h* to approach the outer face 26*j* (and contacts the outer face 26*j*). Since the outer peripheral portion 31 of the spring washer 30D is received in the groove portion 26*g*, and the inner face 26*d* which faces (or contacts) the outer peripheral portion 31 of the spring washer 30D is formed inside the groove portion 26*g*, the radially outward deformation of the spring washer 30D can be reliably suppressed.

Figure 10:
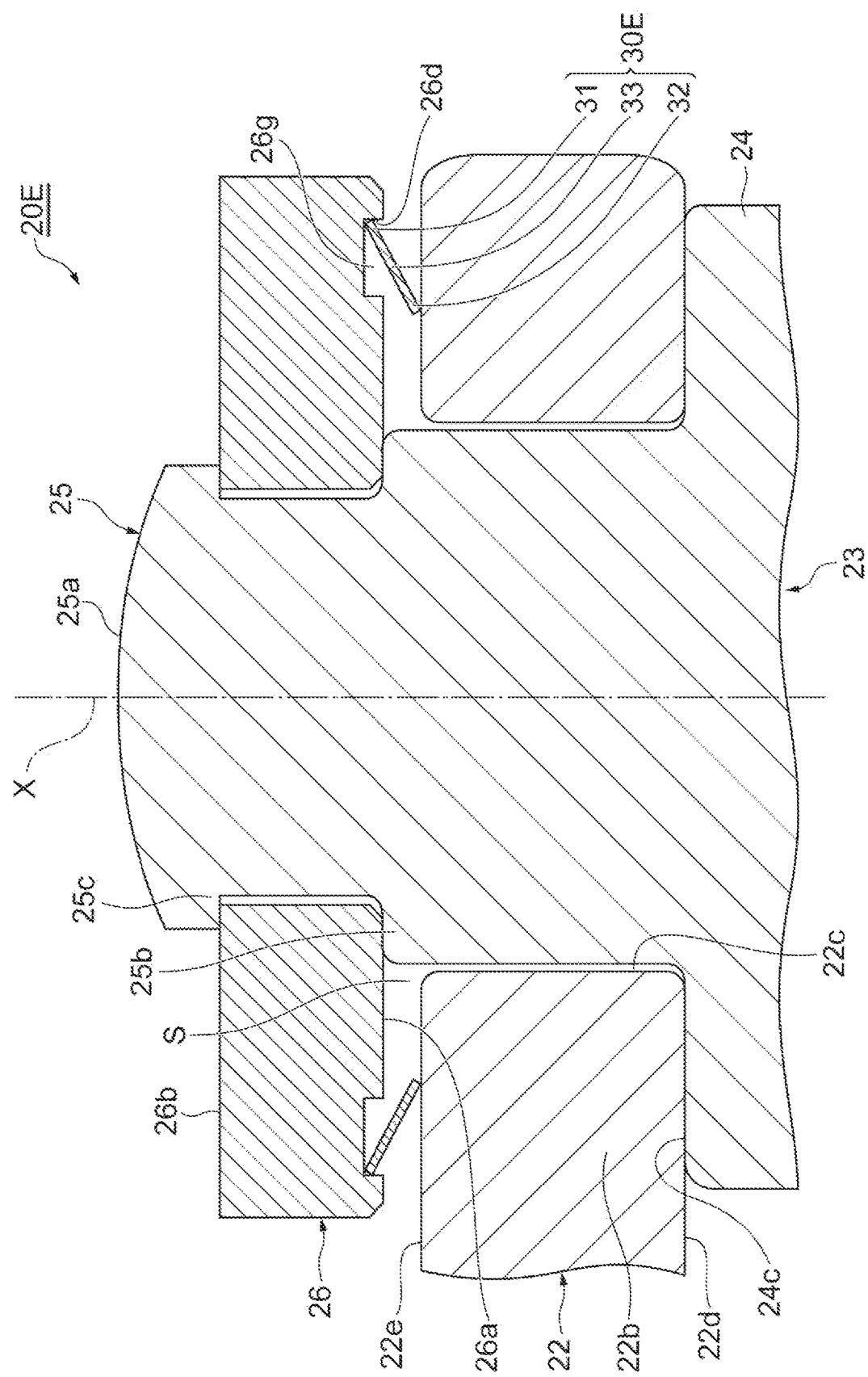
FIG. 10 is a cross-sectional view of another example variable flow rate valve mechanism.

As shown in FIG. 10, a spring washer 30E that has the same configuration as the spring washer 30B may be used, with the lock plate 26 having an annular groove portion 26*g* for receiving the outer peripheral portion 31 of the spring washer 30E. The outer peripheral portion 31 of the spring washer 30E is received in the groove portion 26*g* and faces the inner face (retention surface) 26*d* of the groove portion 26*g*. The inner peripheral portion 32 of the spring washer 30E contacts the second front face 22*e*. The outer peripheral portion 31 contacts the inner face 26*d*. In some examples, the outer peripheral portion 31 may be radially spaced from the inner face 26*d*. Again, the groove portion 26*g* including the inner face 26*d* is a regulating means that regulates radially outward movement of the outer peripheral portion 31 of the spring washer 30E by contacting the outer peripheral portion 31. Such a wastegate valve 20E also produces the same operation and effects as those of the wastegate valve 20A.

Figure 11:
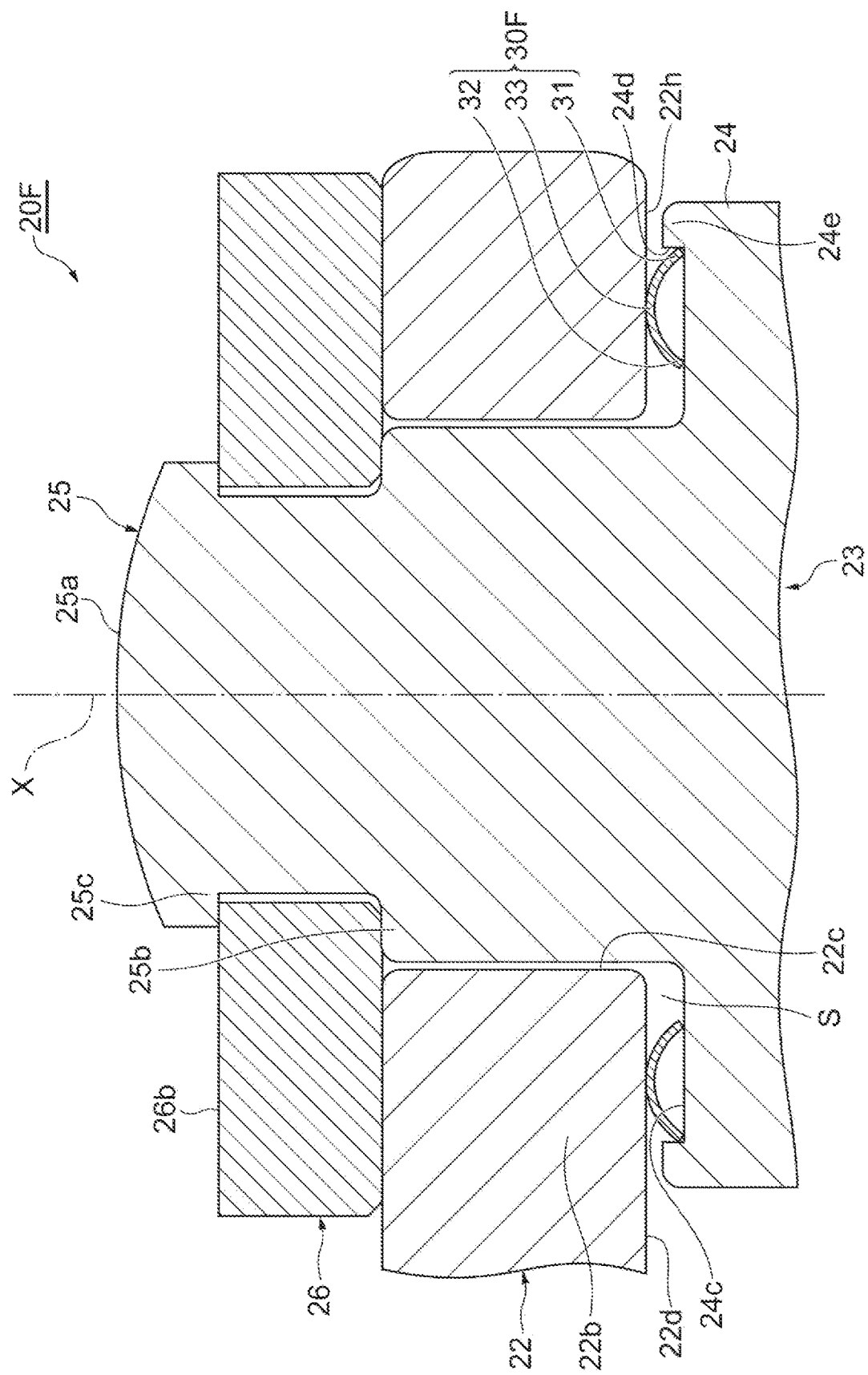
FIG. 11 is a cross-sectional view of another example variable flow rate valve mechanism in which the spring washer is disposed between the attachment member and a valve body.

As shown in FIG. 11, a spring washer 30F that has the same configuration as the spring washer 30 may be used, and a wastegate valve 20F may be employed in which the spring washer 30F is disposed between the distal end portion 22*b* of the valve attachment member 22 and the valve body 24. In some examples, the spring washer 30F is disposed between the first member which is the valve body 24 and the second member which is the valve attachment member 22. The spring washer 30F is in constant contact with the support face 24*c* of the valve body 24 and in constant contact with the first front face 22*d* of the valve attachment member 22. The valve body 24 includes a projecting portion 24*e* that projects toward the gap S. The projecting portion 24*e* has an inner face (retention surface) 24*d* that contacts (faces) the outer peripheral portion 31 of the spring washer 30F. The valve attachment member 22 may have a flat face (flat portion) 22*h* that is flush with the first front face 22*d*, or may have a recessed portion that is recessed from the first front face 22*d* and receives the projecting portion 24*e*. Again, the projecting portion 24*e* including the inner face 24*d* is a regulating means that regulates radially outward movement of the outer peripheral portion 31 of the spring washer 30F by contacting the outer peripheral portion 31. Such wastegate valve 20F also produces the same operation and effects as those of the wastegate valve 20.

Although various examples have been described above, it should be apparent that these examples may be modified in arrangement and detail. For example, the profile of the spring washer is not limited to an annular shape. The profile of the spring washer may be such that the outer circumferential edge has a convexo-concave shape such as that of a gear.

In the various examples shown in FIGS. 5 to 10, a structure may be employed in which the projecting portion and the groove portion or the recessed portion are formed on the member opposite to that in the aspects above and the spring washer is inverted. The various aspects and variations described above may also be employed in the case in which the spring washer is disposed between the attachment member and the valve body as shown in FIG. 11. In some examples, the outer peripheral portion may be radially spaced from the inner face, and the outer peripheral portion of the spring washer contacts the inner face when the spring washer deforms. The present examples can include any aspect that includes the inner face (retention surface) which is capable of contacting, from a radially outer side, the outer peripheral portion of the spring washer which is disposed between the lock member and the attachment member or between the attachment member and the valve body.

The invention claimed is:

1. A variable flow rate valve mechanism comprising:
   a valve including a valve body, and a valve shaft projecting from the valve body in an axial direction of the valve shaft;
   a lock member fixed to the valve shaft at a position axially spaced from the valve body;
   an attachment member disposed between the valve body and the lock member, and holding the valve together with the lock member; and
   a spring washer disposed between the lock member and the attachment member or between the attachment member and the valve body, and contacting a first member being the lock member or the valve body and a second member being the attachment member to impart an elastic force to the attachment member, the spring washer including an outer peripheral portion contacting a facing surface of only one member selected from the group consisting of the first member and the second member while the first member is spaced apart from the second member,
   wherein the one member includes a projecting portion projecting from the facing surface of the one member in the axial direction, the projecting portion has an inner face, the inner face facing inward toward the outer peripheral portion in a radial direction of the valve shaft, and the outer peripheral portion of the spring washer is configured to contact both the facing surface of the one member and the inner face of the projecting portion when the spring washer deforms.

2. The variable flow rate valve mechanism according to claim 1, wherein either of the first member and the second member which does not have the inner face includes:

a seating face in constant contact with the spring washer; and a recessed portion recessed from the seating face, formed in a position axially facing the projecting portion, the recessed portion configured to receive the projecting portion.

3. The variable flow rate valve mechanism according to claim 1, wherein either of the first member and the second member which does not have the inner face includes:

a seating face in constant contact with the spring washer; and a flat portion flush with the seating face and formed in a position axially facing the projecting portion.

4. The variable flow rate valve mechanism according to claim 1, wherein the one member includes a groove portion receiving the outer peripheral portion of the spring washer, the groove portion having the inner face facing the outer peripheral portion of the spring washer.

5. The variable flow rate valve mechanism according to claim 1, wherein the spring washer includes:

the outer peripheral portion in constant contact with the one member;

an inner peripheral portion positioned closer to the valve shaft than the outer peripheral portion, and in constant contact with the one member; and an intermediate portion formed between the outer peripheral portion and the inner peripheral portion, and in constant contact with either of the first member and the second member other than the one member.

6. A turbocharger comprising the variable flow rate valve mechanism according to claim 1, the turbocharger including:

a turbine; and a compressor driven by a rotational drive force by the turbine, wherein the valve body of the variable flow rate valve mechanism is configured to open and close an opening portion of a bypass passage formed in the turbine.

7. A variable flow rate valve mechanism comprising:

a valve including a valve body, and a valve shaft projecting from the valve body in an axial direction;

a lock member fixed to the valve shaft at a position axially spaced from the valve body;

an attachment member disposed between the valve body and the lock member, and holding the valve together with the lock member; and a spring washer disposed between the lock member and the attachment member or between the attachment member and the valve body, and contacting a first member being the lock member or the valve body and a second member being the attachment member to impart an elastic force to the attachment member, the spring washer including an outer peripheral portion contacting a facing surface of only one member selected from the group consisting of the first member and the second member while the first member is spaced apart from the second member, wherein the one member includes a projecting portion projecting from the facing surface of the one member in the axial direction, and the projecting portion is configured to regulate a radially outward movement of the outer peripheral portion of the spring washer by contacting the outer peripheral portion.

8. The variable flow rate valve mechanism according to claim 7, wherein either of the first member and the second member which is spaced apart from the one member includes:

a seating face in constant contact with the spring washer; and a recessed portion recessed from the seating face, formed in a position axially facing the projecting portion, the recessed portion configured to receive the projecting portion.

9. A variable flow rate valve mechanism comprising:

a valve assembly including:

a valve including a valve body, and a valve shaft projecting from the valve body in an axial direction of the valve shaft;

a lock member fixed to the valve shaft; and an attachment member located between the valve body and the lock member, and holding the valve together with the lock member;

a cavity formed by the lock member, the valve body and the valve shaft, the cavity accommodating the attachment member;

a projecting portion projecting from the valve assembly in the axial direction; and a spring washer accommodated in the cavity, the spring washer located between the attachment member and a cavity wall of the cavity in the axial direction, and located between the valve shaft and the projecting portion in a radial direction of the valve shaft, wherein the projecting portion projects in the axial direction from a facing surface of the valve assembly that is in contact with an outer peripheral portion of the spring washer, the projecting portion includes a retention surface facing toward the valve shaft in the radial direction, and the outer peripheral portion of the spring washer is configured to contact the retention surface when the spring washer deforms.

10. The variable flow rate valve mechanism according to claim 9, wherein the lock member includes the projecting portion projecting toward the attachment member in the axial direction.

11. The variable flow rate valve mechanism according to claim 10, wherein the attachment member includes a recessed portion formed in a surface of the attachment member facing the projecting portion in the axial direction, the recessed portion configured to receive the projecting portion.

12. The variable flow rate valve mechanism according to claim 9, wherein the valve body includes the projecting portion projecting toward the attachment member in the axial direction.

13. The variable flow rate valve mechanism according to claim 9, wherein the lock member includes a groove portion receiving the outer peripheral portion of the spring washer, the groove portion having the retention surface facing toward the valve shaft in the radial direction.

14. The variable flow rate valve mechanism according to claim 9, wherein the spring washer includes:

the outer peripheral portion in constant contact with the lock member;

an inner peripheral portion positioned closer to the valve shaft than the outer peripheral portion, and in constant contact with the lock member; and an intermediate portion formed between the outer peripheral portion and the inner peripheral portion, and in constant contact with the attachment member.

15. The variable flow rate valve mechanism according to claim 14, wherein the spring washer has an arch-shaped cross-section cut along the axial direction.

16. The variable flow rate valve mechanism according to claim 9, wherein the spring washer includes:

the outer peripheral portion in constant contact with the lock member;

an inner peripheral portion positioned closer to the valve shaft than the outer peripheral portion, and in constant contact with the attachment member; and an inclined portion having a constant slope from the outer peripheral portion to the inner peripheral portion.

17. The variable flow rate valve mechanism according to claim 9, wherein the retention surface of the valve assembly is formed in an annular shape continuous along the entire circumference around the valve shaft.

18. The variable flow rate valve mechanism according to claim 9, wherein the retention surface of the valve assembly is formed by a plurality of surface elements circumferentially spaced apart from each other around the valve shaft.

19. The variable flow rate valve mechanism according to claim 9, wherein a distance in which the lock member is movable in the axial direction relative to the valve attachment member is within a range of elastic deformation of the spring washer.

20. The variable flow rate valve mechanism according to claim 9, wherein a distance in which the valve body is movable in the axial direction relative to the valve attachment member is within a range of elastic deformation of the spring washer.

* * * * *